United States Patent [19]

Harvey et al.

[11] 4,161,009
[45] Jul. 10, 1979

[54] AUTOMATIC CROWBAR AND ARC QUENCHING SYSTEM

[75] Inventors: Robin J. Harvey, Thousand Oaks; Michael A. Lutz, Mountain View, both of Calif.

[73] Assignee: Hughes Aircraft Company, Culver City, Calif.

[21] Appl. No.: 896,076

[22] Filed: Apr. 13, 1978

[51] Int. Cl.² .............................................. H02H 3/24
[52] U.S. Cl. ........................................ 361/56; 361/92
[58] Field of Search ..................... 361/8, 9, 13, 54, 56, 361/92

[56] References Cited

U.S. PATENT DOCUMENTS 4,004,160   1/1977   Streit et al. ..................... 361/56 X Primary Examiner—Harry E. Moose, Jr.
Attorney, Agent, or Firm—Allen A. Dicke, Jr.; W. H. MacAllister

[57] ABSTRACT

A crossed-field switch device is connected in parallel to a load device which may arc. The characteristics of the crossed-field switch device are that it will not conduct when a high voltage is applied, but when the load device arcs, the crossed-field switch device conducts, taking current from the arc so that the arc quenches. The crossed-field switch device thus is a crowbar which is automatically conductive when the applied voltage decreases due to a line or load short.

7 Claims, 5 Drawing Figures

AUTOMATIC CROWBAR AND ARC QUENCHING SYSTEM

BACKGROUND OF THE INVENTION

This invention is directed to a system and method for automatically crowbaring a circuit for the purpose of quenching an arc in a load device or limiting the arc energy, by applying a crossed-field switch device in parallel to the load device.

Crossed-field electrical discharge devices are devices with two facing electrodes having magnetic and electric fields at an angle to each other. Gas in the interelectrode space is subject to cascading ionization with the magnetic field is on, but the path length of the particles in the interelectrode space is too short for cascading ionization when the magnetic field is below a critical value, so the device becomes nonconducting. Thus, it can be arranged to function as an off-switch by reducing the magnetic field.

Furthermore, with the normal, above critical magnetic field and a high voltage applied thereto, the crossed-field switch device is non-conductive because the high interelectrode potential maintains a short charged particle path even in the presence of the magnetic field. However, when the applied potential is reduced, at a particular point where cascading ionization can commence, the device automatically becomes conductive. With this arrangement, the crossed-field switch device automatically acts as a crowbar, to short-circuit the load when the potential across the load fails.

Crossed-field electrical discharge devices were primarily laboratory curiosities, until recent developments have shown that they are capable of carrying fairly high direct currents and offswitching against fairly high voltages. This capability has resulted in their design into a number of circuit breakers. In such circuit breakers, the crossed-field devices become crossed-field off-switching devices which perform the function of off-switching current to result in increasing circuit breaker impedance. Prior patents which can use suitable cross-field switch devices as their switching elements in circuit breaker environments include K. T. Lian Pat. No. RE 27,557; K. T. Lian and W. F. Long Pat. No. 3,641,358; M. A. Lutz and W. F. Long Pat. No. 3,660,723. These illustrate the manner in which a crossed-field switch device can be used.

Two patents which illustrate particular structure of a crossed-field switch device are G. A. G. Hofmann and R. C. Knechtli Pat. No. 3,558,960 and M. A. Lutz and R. C. Knechtli Pat. No. 3,638,061. These patents discuss the maintenance of pressure in the interelectrode gap and during conduction. Gunter A. G. Hofmann Pat. No. 3,769,537 teaches the use of a perforated inner electrode to supply gas to the gap. Furthermore, G. A. G. Hofmann Pat. No. 3,604,977 and M. A. Lutz and G. A. G. Hofmann Pat. No. 3,678,289 discuss the management and control of the offswitching of crossed-field switch devices by control of the magnetic field.

M. A. Lutz and R. Holly Pat. No. 3,890,520 teaches a field emission device for supplying initial electrons to the interelectrode space. J. R. Bayless and R. J. Harvey Pat. No. 3,949,260 uses a thin wire discharge for that purpose. Michael A. Lutz and Gunter A. G. Hofmann Pat. No. 3,876,905 teaches a particular electrode structure for crossed-field devices. Gunter A. G. Hofmann Pat. No. 3,873,871 relates to the physical structure of the crossed-field switch device and particularly the arrangements of the magnetic field windings. Continuing improvements are being made to enhance the voltage and current capabilities, as well as life and reliability of the crossed-field switch devices.

The method of on-switching the crossed-field switch device of G. A. G. Hofmann Pat. No. 3,714,510 comprises the initiation of an interelectrode arc discharge which reduces the interelectrode potential, and after extinguishment of the interelectrode arc, the interelectrode potential is sufficiently low to initiate and permit conduction in the glow mode.

The patent application of R. J. Harvey, Ser. No. 797,720 filed May 17, 1977 is directed to the concept of on-switching by creating a high magnetic field in a localized area to permit a glow mode plasma to initiate in the localized area, with consequent reduction of the interelectrode voltage and spreading of the plasma so that glow mode plasma discharge takes place in the entire active area of the interelectrode space.

SUMMARY OF THE INVENTION

In order to aid in understanding this invention, it can be stated in essentially summary form that is directed to an automatic crowbar system and method wherein a crossed-field switch device is connected to conduct in parallel to a load device so that with a magnetic field applied to the crossed-field switch device, when the load device arcs and the line voltage decreases due to the arc, then the crossed-field switch device conducts to take current away from the arc to protect the arcing load device.

It is thus an object of this invention to provide an arc quenching system which includes a crossed-field switch connected in parallel to a load which may arc so that when an arc occurs in the load device, the crossed-field switch device conducts to draw the short circuit current away from the arcing device so that the arc in the arcing load device quenches. It is a further object to provide a method of quenching arcs which includes the provision of a crossed-field switch device in parallel to a potentially arcing load and arranging the system so that the crossed-field switch device is ready to automatically accept the circuit current to permit self-quenching of the arc in the arcing load device. It is a further object to provide a protection system and method which automatically provides for a crow-bar circuit to divert arc current away from an arcing load device to prevent the dissipation of excess energy in the load device and to permit quenching of the arc therein.

Other objects and advantages of this invention will become apparent from a study of the following portion of this specification, the claims and the attached drawings.

DESCRIPTION OF THE PREFERRED EMBODIMENT

Figure 1:
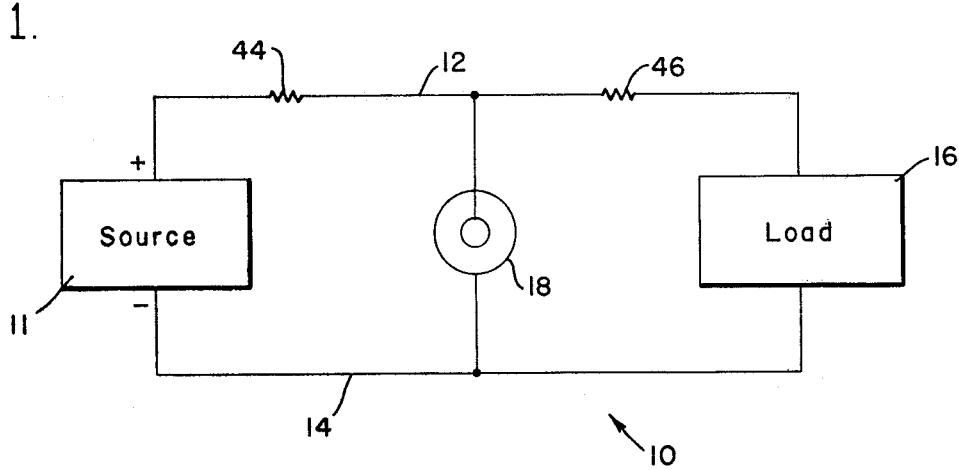
FIG. 1 is a schematic circuit diagram showing a first preferred embodiment of the arc quenching system of this invention.

FIG. 1 shows an arc quenching system 10 having a source 11 connected through a pair of buses 12 and 14 to a load 16. A crossed-field switch device 18 is connected between the buses 12 and 14 in parallel to the load 16.

The load 16 is of a type that may internally arc. The load device 16 is also the type that if the current is diverted out of the load device arcing can quench. The load 16 is also such that the insulative property of the load device 16 can be re-established such as in gas insulated high voltage systems. Such systems may be subject to spontaneous or transiently triggered flashovers when the basic insulation level is approached by the operating voltage level.

Figure 4:
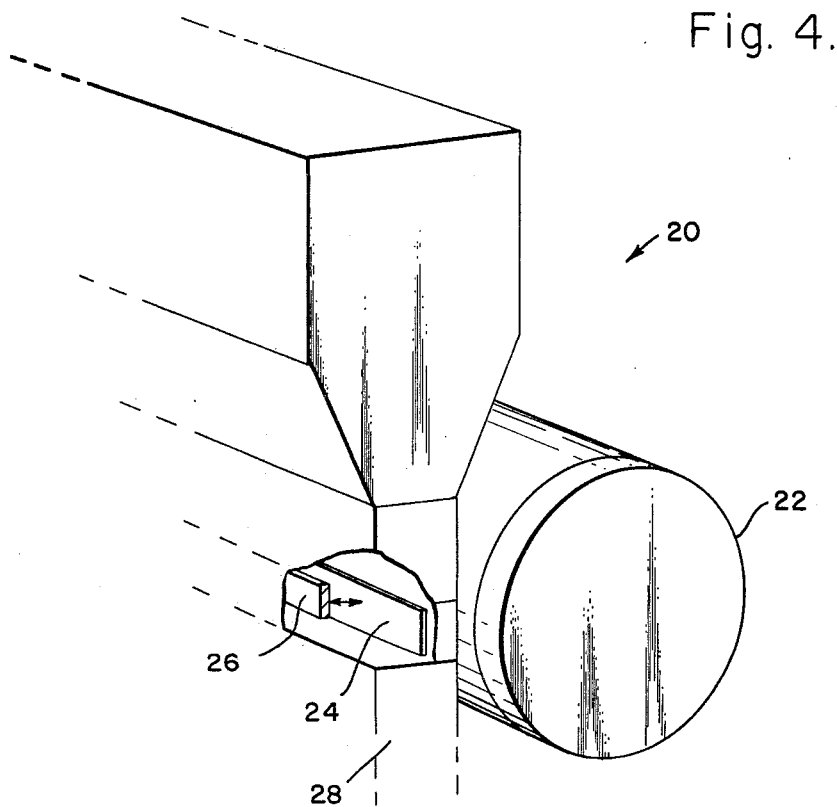
FIG. 4 is a perspective view of a portion of a laser device, with parts broken away and parts shown in section, with the laser device illustrating a first example of a potentially arcing load device.

One type of device in which an arc may occur and which may be aided by quenching such an arc is a high power, flowing gas laser such as the one indicated at 20 in FIG. 4. The laser 20 has an electron gun 22, which directs an electron beam through a foil window 24 which also serves as an electrode or conductor. An electrode or conductor 26 faces the foil window 24 and serves as its opposing electrode. A channel 28 supplies upwardly flowing gas through the interelectrode space between the electrodes 24 and 26. The interelectrode space is an excitation region wherein lasing activity takes place. The details of the laser 20 are disclosed in E. R. Peresini U.S. Pat. No. 3,962,656. The disclosure of that patent is incorporated herein in its entirety by this reference. The two electrodes 24 and 26 are connected to the buses 12 and 14 and the current therebetween is the load current. Normally, there is a glow discharge between the electrodes. However, when a glow to arc transition occurs it is necessary to remove the current from the arcing laser in a time no longer than 5-10 microseconds in order to avoid puncturing the foil window 24. In a laser of interest, the electrode spacing is four centimeters and the channel width in the flow direction is also four centimeters. The flow speed is such that fresh gas is supplied to the channel every 300 microseconds. Thus, arc suppression need only occur for at least 300 microseconds.

Figure 5:
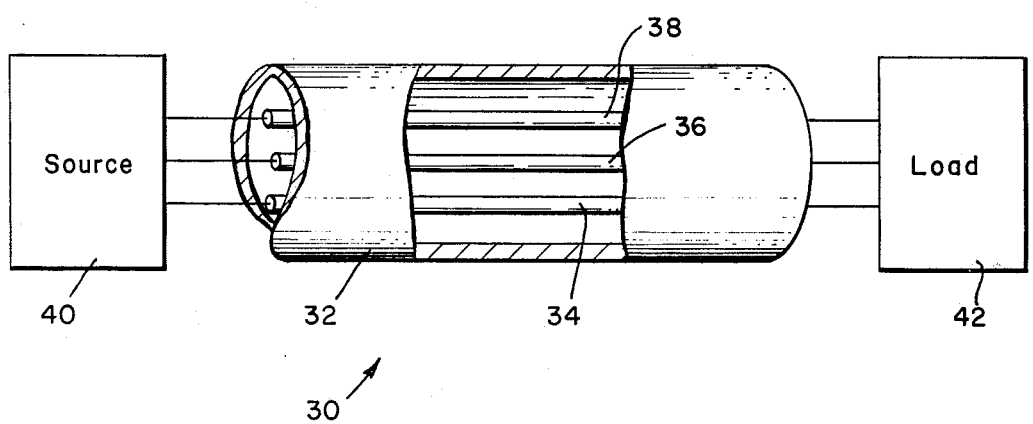
FIG. 5 is a side elevational view of an electrical conductor, with parts broken away and parts taken in section, with the end devices in association therewith being shown schematically.

Another example of a load device to be placed in the position of the load device 16 is a gas insulated cable 30 shown in FIG. 5. The cable 30 is comprised of a tubular housing 32 in which is located at least one conductor. In the present case, a set of three conductors 34, 36 and 38 extend through the housing. The conductors are spaced from each other and are supported to be electrically insulated from each other. A suitable insulating gas is placed within the tubular housing 32 to enhance the dielectric strength between the conductors and between each of the conductors and the tubular housing 32. A suitable gas for this purpose is sulfur hexafluoride.

A source 40 supplies current through the cable 30 to a load 42. If the conductors within the cable 30 arc across or to ground as represented by the housing 32, then the cable 30 becomes a load to the source 40.

The self-recovery feature of gas insulation allows it to regain its voltage withstand strength almost immediately after a flashover has occurred. The deionization time of the gas in the arc path is very short. As soon as the flashover arc is extinguished, the gas begins to recover the voltage withstand strength that it had before the flashover occurred. Compressed gas insulated apparatus and other apparatus where there is gas in the interelectrode space will exhibit this self-recovery characteristic if an internal flashover is cleared sufficiently quickly. There appears to be a certain maximum coulomb input to which a gas insulated structure can be exposed without damaging the physical insulation and the adjacent structure and without degrading the voltage withstand capability. Exceeding the maximum coulomb input will cause the voltage withstand strength to decrease. If the crossed-field switch device 18 can be operated quickly enough to divert the current from the breakdown region to another path, then in a relatively short time voltage could be reapplied to the gas-filled device after the current had been diverted. Self recovery of the gas can permit the voltage to be quickly reapplied.

There are two cases where an automatic crowbar is useful. First, if the energy input to the arc is sufficiently limited, then no permanent physical damage occurs from the arcing. The crossed-field switch device 18 can automatically turn on to provide a parallel short circuit or crowbar path to thus limit the arc energy and thus prevent physical damage.

In the second case, when the insulation is of self-healing characteristic as in the two gas insulated devices described above, then the voltage can be quickly reapplied. The crossed-field switch device 18 can be connected in parallel with such conductors, with the magnetic field on, so when the interelectrode voltage falls then the crossed-field switch device is automatically conductive. In those cases where the insulation value can be reestablished as in gas insulated devices, then the crossed-field switch device can subsequently be turned off even against a substantial DC current and voltage so that the voltage is quickly reapplied to the conductors. These circumstances are uniquely satisfied by the crossed-field switch device, which both automatically turns on and can turn off against an applied current and voltage.

Considering the system of FIG. 1, in order to be effective when the load 16 arcs the crossed-field switch device 18 must carry the current and divert it from the arc in the load. A resistance 44 is connected in the bus 12 between the source 10 and the connection for the crossed-field switch device 18. Additionally, a resistor 46 is connected in the bus 10 between the load 16 and the connection for the crossed-field switch device 18. The resistors 46 and 48 may be partly or all in the source 11 and the load 16. When the load to be protected arcs, the circuit current rises to $$I = V/(R_{44} + R_{46}) \tag{1}$$

where:

I—current from source
V—source voltage.

The voltage across the crossed-field switch device 18 falls to:

$$V_{18} = V_{16} + VR_{46}/(R_{44} + R_{46}) \tag{2}$$

where:

$V_{16}$ = arc drop in load 16.

The sizes of the resistors 44 and 46 are as small as possible to minimize dissipation during normal operation. However, the values of the resistors must be large enough so that:

$$V_{18} = V_{16} + IR_{46} > V_x \quad (3)$$

where:

$V_x$—conduction voltage of the crossed-field switch device 18.

Under these conditions, the switch 18 conducts to short the source to limit voltage and current applied to the load. Thus, the switch 18 acts as a crowbar short circuit device.

Furthermore, $$V/R_{44} < I_{max\ 18} \quad (4)$$

so that the current capability of the crossed-field switch device 18 is not exceeded.

Whether or not the arc in the load 16 quenches depends on the current-voltage characteristics of the arc. In order for the current to transfer from the arc, it is required that the negative arc resistance $R_{arc}$ is larger in magnitude than the resistance of the resistor 46. Under those circumstances an incremental drop in current $\Delta I$ in the arc will cause an incremental rise in voltage $\Delta V_{16}$ such that $$\Delta V_{16} = R_{16}\Delta I \quad (5)$$

so that it exceeds the voltage drop $\Delta V_{46}$ across the resistor 46

$$\Delta V_{16} > \Delta V_{46} = R_{46}\Delta I. \quad (6)$$

This is a runaway condition providing the resistance in the arc is always greater in magnitude than the resistance of the resistor 46 for all currents from the maximum arcing current down to zero. In that case, the current in the arc will go to zero and the arc will quench.

Figure 3:
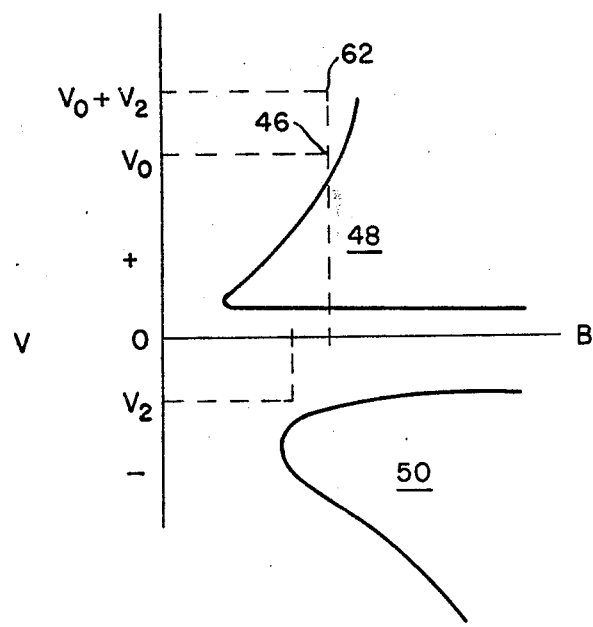
FIG. 3 is a graph showing operating parameters of the crossed-field switch device used in the arc quenching system of this invention.

After the arc is quenched and the gas has regained its insulation qualities then the crossed-field switch device 18 can be turned off and the voltage reapplied to the load. FIG. 3 illustrates how the natural characteristics of a crossed-field switch device provide for the desired system operating characteristics. During normal operation, the system operates at an operating point 46 with a normal load voltage and with the magnetic field applied to the crossed-field switch device. When arcing appears in the load 16, then the line voltage drops so that the operating point moves within the enclosed curve in the upper half of FIG. 3 which is a conductive region 48. The operating point remains in the conductive region, usually in the lower part of the dotted, vertical operating line indicating the particular magnetic field. Inductively caused reverse voltages during transients will not cause reverse conduction of the crossed-field switch device 18 because a lower conductive region 50 is farther away from the origin of the curve due to the inherent nonsymmetrical characteristics of the physical systems constraining the glow mode discharge in the crossed-field switch device.

Figure 2:
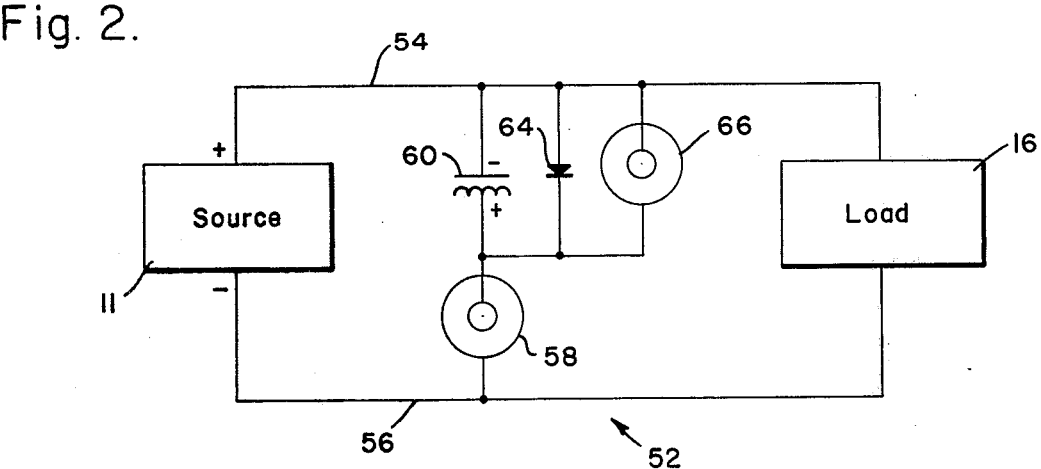
FIG. 2 is a schematic circuit diagram showing a second preferred embodiment of the arc quenching system of this invention.

FIG. 2 shows a system 52 similar to the system 10 but incorporating further system components so that it is capable of functioning under conditions outside of the capability of the system 10. The system 52 incorporates the source 11 and load 16, the same as the system 10. The source 11 in both cases is preferably a DC source, with the upper bus being positive, although the system may be of alternating nature under special circumstances whereby action is achieved during a half cycle of operation. In the system 52 a bus 54 and a bus 56 interconnect the source 11 and the load 16. Connected in parallel across the buses 54 and 56 is a serially connected crossed-field switch device 58 and a pulse forming network 60.

The pulse forming network 60 is generically illustrated. It is designed so that the output pulse shape of the pulse forming network 60 is such as to cancel the arc current pulse in the load 16 with enough accuracy and for a long enough time to insure an extinction of the arc. Pulse forming network 60 may be a group of parallel connected capacitors connected with serial inductance so that the capacitors serially discharge to maintain a longer pulse than would be achieved by discharge of a single capacitor. Other physical constructions of such a pulse forming network are possible. Its function is to produce a long enough pulse of high enough value to cancel the arc current. The pulse forming network 60 is prechanged to a voltage $V_2$.

In operation, the pulse forming network 60 is precharged in the polarity indicated in FIGS. 2 and 3 and the magnetic field is applied to crossed-field switch device 58. This places the operating point of the crossed-field switch device 58 at an operating point 62, see FIG. 3. The operating point 62 is above the conductive region 48 so that the crossed-field switch device 58 is nonconducting. When load 16 arcs, $V_o$ drops. The first result in the pulse forming network 60 is that even though $V_o$ may drop below the conductive region 48 of FIG. 3, the addition of $V_2$ thereto maintains the crossed-field switch device 58 in the conductive region so that conduction takes place. As conduction takes place, the pulse forming network 60 discharges cancelling the arc current in the load. As stated above, the discharge current of the pulse forming network 60 will cancel the arc current so that the arc can extinguish itself. After extinguishment, the pulse forming network 60 charges up in the opposite direction from that shown in FIG. 2, until $V_o$ is reached.

The crossed-field switch device 58 may be turned off before $V_o$ is applied to the pulse forming network 60, to thus protect the pulse forming network from over-voltage in the reverse polarity. However, if it is necessary to permit current to flow parallel to the pulse forming network 60 in order to permit the insulation value in the load 16 to reseal itself, then a diode 64 or a crossed-field switch device 66 is connected in parallel to the pulse forming network 60. In the case of the diode 64, as soon as voltage is applied to the pulse forming network 60 in the opposite polarity from that shown on FIG. 2, then the diode 64 passes current to prevent the build-up of opposite polarity. In such a case, all of the voltage is applied to crossed-field switch device 58 as it is turned off. However, if the crossed-field switch device 58 cannot handle that current, then the source 11 must be turned off.

Crossed-field switch device 66 can be used to pass reverse current instead of the diode 64. In such a case, the crossed-field switch device 66 is turned on to pass reverse current after the arc is quenched. It is turned on before the value of voltage impressed across the pulse forming network 60 in the reverse direction is excessive to prevent reverse voltage from damaging the pulse forming network 60. Now the crossed-field switch device 58 and the crossed-field switch device 66 are connected in series and with proper control devices these two crossed-field switch devices can be turned off at the same time. The voltage division between the crossed-field devices 58 and 66 can be controlled as the turn-off proceeds to prevent excessive voltage buildup across the pulse forming network 60.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. An automatic arc quenching system comprising:
    a source of voltage connected to first and second buses;
    a device connected to both said first and second buses, said device having first and second conductors therein respectively connected to said first and second buses, said device being such that arcing may occur between said first and second conductors; and
    a crossed-field switch device connected between said first and second buses, said crossed-field switch device being conditioned so that is is nonconductive at normal bus voltage and is conductive when an arc occurs between said conductors in said device so that when an arc occurs between said conductors in said device, said crossed-field switch device provides a parallel current path to the arc so that arc energy is reduced.

2. The system of claim 1 wherein said device has gas insulation between said conductors so that when the arc is quenched the insulation between said conductors can heal.

3. The system of claim 2 wherein said device is a gas laser.

4. The system of claim 2 wherein said device is a gas insulated conductor.

5. The system of claim 1 wherein a pulse forming network is serially connected with said crossed-field switch device between said first and second buses so that said pulse forming network can be precharged to provide an arc quenching pulse in said device between said conductors in the opposite polarity to arc current.

6. The system of claim 5 wherein a diode is connected in parallel to said pulse forming network to prevent charge buildup on said pulse forming network in the opposite polarity to its original charge.

7. The system of claim 5 wherein a second crossed-field switch device is connected in said system in parallel to said pulse forming network in order to prevent over-voltage from being applied to said pulse forming network in opposite polarity to the original pulse voltage and so that both of said crossed-field switch devices are connected in series to carry system current in parallel to said device so that both of said crossed-field switch devices can be turned off to return system current to said device.

* * * * *